(12) United States Patent
Rothman et al.

(10) Patent No.: US 8,631,186 B2
(45) Date of Patent: Jan. 14, 2014

(54) HARDWARE AND FILE SYSTEM AGNOSTIC MECHANISM FOR ACHIEVING CAPSULE SUPPORT

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 918 days.

(21) Appl. No.: 12/242,342

(22) Filed: Sep. 30, 2008

(65) Prior Publication Data
US 2010/0082932 A1 Apr. 1, 2010

(51) Int. Cl.
*G06F 12/00* (2006.01)
*G06F 13/00* (2006.01)
*G06F 13/28* (2006.01)

(52) U.S. Cl.
USPC ............ 711/103; 711/166; 711/E12.001; 710/8; 713/1; 713/100; 713/300

(58) Field of Classification Search
USPC ........... 711/103, 166, E12.001; 710/8; 713/1, 713/100, 300
See application file for complete search history.

(56) References Cited

U.S. PATENT DOCUMENTS

| | | | | |
|---|---|---|---|---|
| 5,568,641 A * | 10/1996 | Nelson et al. | | 713/2 |
| 6,266,736 B1 * | 7/2001 | Atkinson et al. | | 711/103 |
| 6,279,120 B1 | 8/2001 | Lautenbach-Lampe et al. | | |
| 6,640,334 B1 * | 10/2003 | Rasmussen | | 717/171 |
| 6,732,267 B1 * | 5/2004 | Wu et al. | | 713/100 |
| 6,948,094 B2 | 9/2005 | Schultz et al. | | |
| 7,117,396 B2 | 10/2006 | Komarla et al. | | |
| 7,308,609 B2 | 12/2007 | Dickenson et al. | | |
| 7,788,537 B1 | 8/2010 | Yellen et al. | | |
| 7,900,033 B2 | 3/2011 | Rothman et al. | | |
| 2003/0126516 A1 | 7/2003 | Komarla et al. | | |
| 2005/0229173 A1 * | 10/2005 | Mihm et al. | | 717/171 |
| 2005/0240826 A1 | 10/2005 | Dickenson et al. | | |
| 2006/0168439 A1 * | 7/2006 | Oguma | | 713/2 |
| 2007/0061634 A1 | 3/2007 | Marisetty et al. | | |
| 2007/0157051 A1 * | 7/2007 | Hernandez et al. | | 714/1 |
| 2008/0046877 A1 | 2/2008 | Ford | | |
| 2009/0006827 A1 | 1/2009 | Rothman et al. | | |
| 2009/0006834 A1 * | 1/2009 | Rothman et al. | | 713/2 |
| 2009/0327679 A1 | 12/2009 | Huang et al. | | |

OTHER PUBLICATIONS

Non Final Office Action received for U.S. Appl. No. 12/108,136, mailed on Mar. 14, 2011, 8 pages.
Intel® Platform Innovation Framework for EFI Capsule Specification, Draft for Review, Version 0.9, Sep. 16, 2003, 31 pages.
Intel® Platform Innovation Framework for UEFI, Framework Overview, Retrieved on May 27, 2011, web page available at: http://www.intel.com/technology/framework/overview1.htm.
Unified Extensible Firmware Interface Specification, Version 2.1, Jan. 23, 2007, 1682 pages.

* cited by examiner

*Primary Examiner* — Edward Dudek, Jr.
(74) *Attorney, Agent, or Firm* — Caven & Aghevli LLC

(57) ABSTRACT

Methods and apparatus relating to a hardware and file system agnostic mechanism for achieving capsule support are described. In one embodiment, content associate with a capsule are stored in a non-volatile memory prior to a cold reset. A capsule descriptor may also be constructed, prior to the reset, which includes information about the physical location of the capsule content on the non-volatile memory. Other embodiments are also described and claimed.

23 Claims, 5 Drawing Sheets

| Variable Name | Attribute | Description |
|---|---|---|
| CapsuleVariable | NV, BS, RT | A descriptor which provides a physical description of the location(s) of the capsule content. |

```
typedef struct {
    UINT8       HardwareDevicePath;
    UINT8       Vendor;
    UINT16      Length;
    EFI_GUID    VendorGuid;
    UINT32      LBAArray[];
} CAPSULE_DESCRIPTOR
```

| Variable Name | Attribute | Description |
| --- | --- | --- |
| CapsuleVariable | NV, BS, RT | A descriptor which provides a physical description of the location(s) of the capsule content. |

```
typedef struct {
  UINT8         HardwareDevicePath;
  UINT8         Vendor;
  UINT16        Length;
  EFI_GUID      VendorGuid;
  UINT32        LBAArray[];
} CAPSULE_DESCRIPTOR
```

HARDWARE AND FILE SYSTEM AGNOSTIC MECHANISM FOR ACHIEVING CAPSULE SUPPORT

FIELD

The present disclosure generally relates to the field of computing. More particularly, an embodiment of the invention generally relates to a hardware and file system agnostic mechanism for achieving capsule support.

BACKGROUND

Some computing platforms may use a facility called capsule construction to communicate data back to a platform BIOS (Basic Input/Output System), so that the BIOS may achieve a variety of different functions such as firmware updates. One limitation of this facility is that communication of data presumes the ability to pass information that is stored in memory and initiate a non-memory-destructive reset (also referred to as a "warm" reset), so that the underlying BIOS can then read the associated data from the memory to initiate the variety of functions. However, one problem that is encountered is that more and more platforms (including desktop, mobile, server, and even the MID (Mobile Internet Device) or embedded platforms) are unable to guarantee that memory would not be perturbed across a reset, thus greatly limiting this kind of functionality.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software (including for example micro-code that controls the operations of a processor), or some combination thereof.

Some of the embodiments discussed herein result in the movement of data associated with a capsule (e.g., where the data moved may range from very small amounts of data to many megabytes or more in various embodiments) to a non-volatile storage media. The capsule data moved may include content and a descriptor associated with the capsule. The non-volatile storage media may store data in accordance with any type of a file system that a corresponding OS (Operating System) is using, rendering such embodiments file system agnostic. Generally, a file system (also referred to as "filesystem") is a mechanism for storing and organizing computer files and the data they contain to make it easy to find and access them via an OS. Hence, techniques discussed herein are equally applicable to any file system. Also, such embodiments are able to provide capsule support across a "cold" reset (or memory-destructive reset), regardless of the underlying file system that is being utilized. To this end, a function referred to herein as "capsule update" is supported regardless of the underlying hardware or file system characteristics.

In one embodiment, at least some capsule related information (such as content for an update to firmware and a descriptor for the content) is stored in a non-volatile storage device prior to a memory-destructive reset, which in turn avoids the requirement of a "warm" (or non-memory-destructive) reset to achieve the processing of a capsule. This may be especially valuable since it allows for a solution to systems which have no "warm" reset capability.

Figure 1:
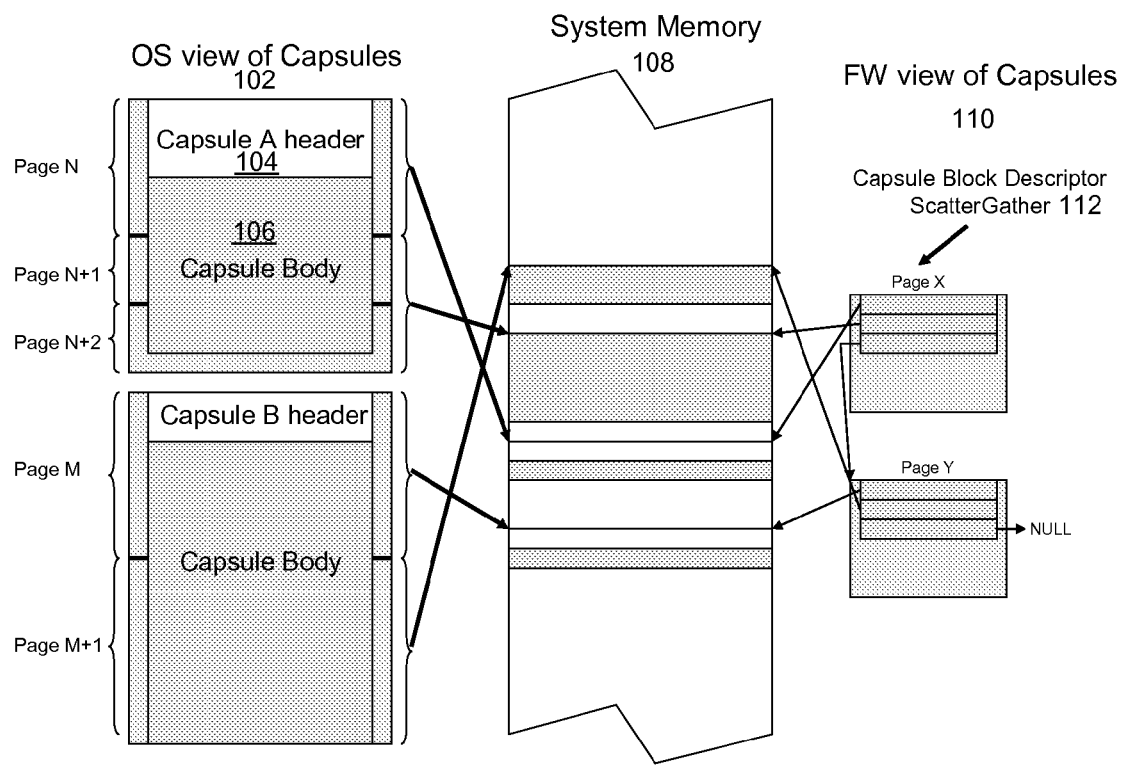
FIG. 1 shows a sample illustration of how a capsule may be viewed by various components, according to some embodiments.

FIG. 1 shows a sample illustration of how a capsule may be viewed by various components, according to some embodiments. More particularly, an OS 102 may view a capsule (Capsule A) as having a header 104 (which may conform to Unified Extensible Firmware Interface (UEFI) specification that defines a new model for the interface between operating systems and platform firmware, version 2.1, May 2008) and a body 106 (such as content associated with the capsule A). Moreover, a capsule may include two items, a header which describes the "type" of data the capsule has, and a body with the data which is the content that is to be communicated. So, in the case of a BIOS image that is 1 MB in size, the header is the fixed description item as specified in the sample definition below, and the data is the 1 MB of content associated with the BIOS image.

```
typedef struct {
    EFI_GUID    Capsule Guid;
    UINT32      HeaderSize;
    UINT32      Flags;
    UINT32      CapsuleImageSize;
} EFI_Capsule_Header;
``` where:
CapsuleGuid refers to a GUID (Globally Unique Identifier) that defines the contents of a capsule.
HeaderSize refers to the size of the capsule header since CapsuleGuid may imply extended header entries.
Flags refers to bit-mapped list describing the capsule attributes. The Flg values of 0x000-0xFFF are defined by CapsuleGuid. Flag values 0x10000-0xFFFFFFFF are defined by the specification.
CapsuleImageSize refers to the capsule size in bytes.

The header 104 and body 106 are stored in a system memory 108. Firmware (FW) 110 views the capsule in turn via capsule block descriptor 112. Generally, firmware refers to a computer program that is embedded in a hardware device, for example a microcontroller. It may also be provided on flash memory or as a binary image file that may be uploaded onto existing hardware by a user.

Moreover, FIG. 1 shows what a capsule may consist of with regards to an OS view of a scattered set of memory-backed pages which are described and ultimately consumed by a platform firmware. Since capsules may be used by some platforms to facilitate communication of data (e.g., firmware update) from the OS to the BIOS, many of its operations depend on the ability to reset the machine without perturbing memory (or a "warm" reset). If this cannot be accomplished, the machine is functionally handicapped.

Figures 2, 3:
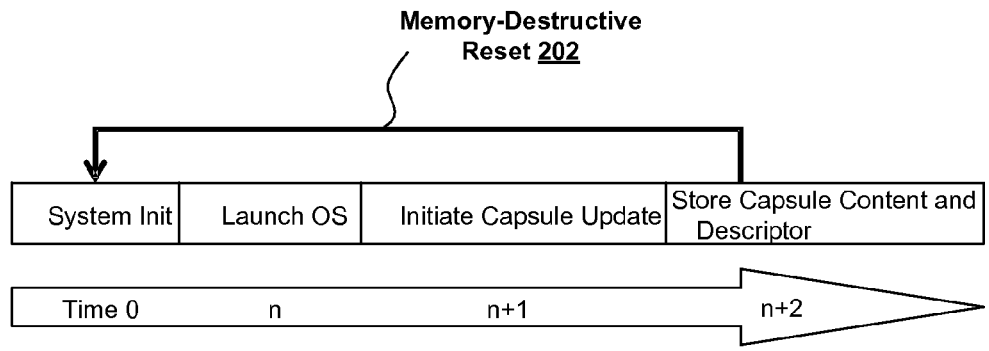
FIG. 2 illustrates a high level view of an embodiment of the invention with a timeline.
FIG. 3 illustrates various information about a capsule descriptor, according to an embodiment.

FIG. 2 illustrates a high level view of an embodiment of the invention with a timeline. As shown in FIG. 2, at time 0, system may be initiated. At time n, OS may be launched. At time n+1, capsule update may be initiated and at time n+2 capsule content and descriptor may be stored. The capsule update may be requested by the OS, for example, based on a user request or automated system request.

In an embodiment, the stored capsule content may include data (including but not limited to instructions) that is needed for an update associated with the capsule (e.g., a firmware update). The capsule content data may range in size from very small amounts of data to many megabytes or more in various embodiments. The capsule descriptor may provide a description of the physical location or a physical address of the capsule content in a file system agnostic manner in an embodiment. Following storage of the capsule descriptor, a memory-destructive reset or cold reset may be performed 202.

FIG. 3 illustrates various information about a capsule descriptor, according to an embodiment. A capsule descriptor may provide a description of the physical location of the capsule content. As shown, a variable (CapsuleVariable) may be defined for the capsule descriptor which includes attributes NV (Non-Volatile), BS (Boot Service), and/or RT (Run-Time) in an embodiment. The NV attribute is a feature of the variable if it will survive a platform reset and the latter two, BS and RT are attributes associated with when the variable is accessible (e.g., if one specifies BS/RT, then the capsule is accessible any time during the platform initialization/runtime).

In FIG. 3, a sample capsule variable type definition is also shown where: (a) HardwareDevicePath refers to a device path (that may be a pointer to describe which device is carrying the data payload in an embodiment—for instance, it might specify that the first physical hard-drive, e.g., plugged into a Small Computer System Interface (SCSI) controller X, is the target); (b) Vendor refers to a pointer to a device path which specifies the vendor of the capsule data itself; (c) Length refers to the length in bytes of the entire capsule payload including the header; and (d) LBAArray refers to an array of sector locations on which the capsule data is located.

Figure 4:
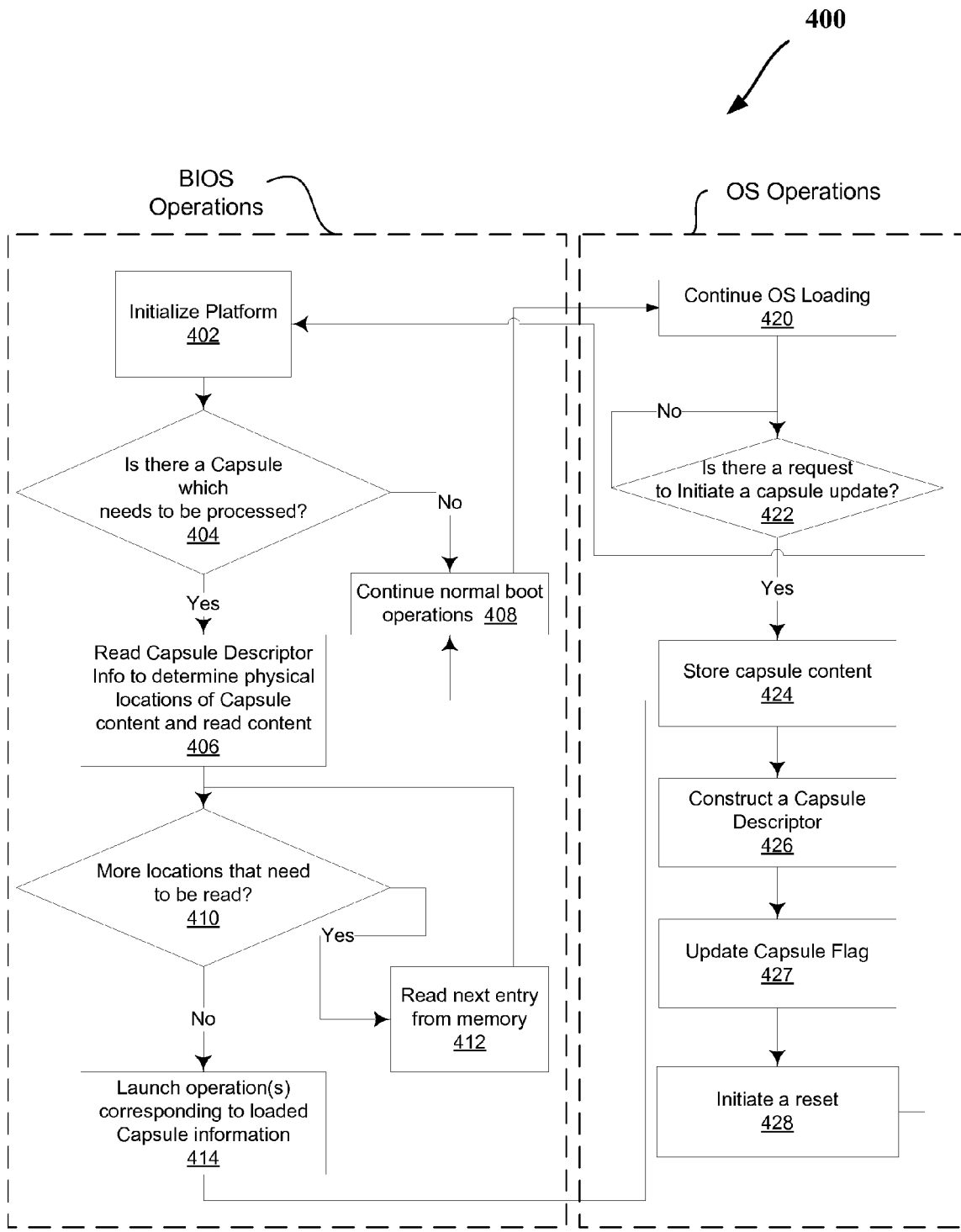
FIG. 4 illustrates a flow diagram of a method according to an embodiment of the invention.

FIG. 4 illustrates a flow diagram of a method 400 to process a capsule update across a cold reset, according to an embodiment. The method 400 may be hardware and file system agnostic as has been discussed herein. As illustrated in FIG. 4, method 400 includes operations that are performed by a platform BIOS and a platform OS.

More particularly, at an operation 402, the platform may be initialized (e.g., including early hardware initialization of memory, processor, etc.). At an operation 404, it may be determined whether a capsule (e.g., the CapsuleVariable of FIG. 3) is pending processing. In an embodiment, operation 404 may check for the value stored in a capsule update request flag which may be stored in non-volatile memory (such as those discussed with reference to FIGS. 5-6). If so, an operation 406 reads the capsule descriptor information to determine LBA locations of capsule content data and reads the content. Otherwise, method 400 continues with normal boot operations at operation 408.

At an operation 410, it is determined whether additional LBA locations are to be read (e.g., where the number of LBAs to read is determined by dividing the length in bytes by the size of a single sector (e.g., 512 bytes)). If so, next LBA array entry may be read from a non-volatile memory (such as a hard disk or other non-volatile memory discussed with reference to FIGS. 5-6) at an operation 412. Otherwise, operation(s) indicated by the loaded capsule information may be launched at an operation 414, after which the method 400 resumes with operation 408.

As for OS operations, after operation 408, OS loading may be continued at an operation 420. At an operation 422, it may be determined whether a request to initiate a capsule update exists (e.g., as initiated through the platform OS by a user or other applications whether locally or remotely). If so, an operation 424 stores capsule content, e.g., to non-volatile storage such as the storage devices discussed with reference to FIGS. 5-6. At an operation 426, a capsule descriptor may be constructed, e.g., including a list of physical locations where capsule data is stored such as discussed with reference to FIG. 3. At an operation 427, a capsule update request flag may be updated. The capsule update request flag which may be stored in non-volatile memory (such as those discussed with reference to FIGS. 5-6) At an operation 428, a reset may be performed, which may be a cold boot if the platform does not support a warm boot. Otherwise, a warm boot may be performed. After operation 428, the method 400 resumes at operation 402.

Figure 5:
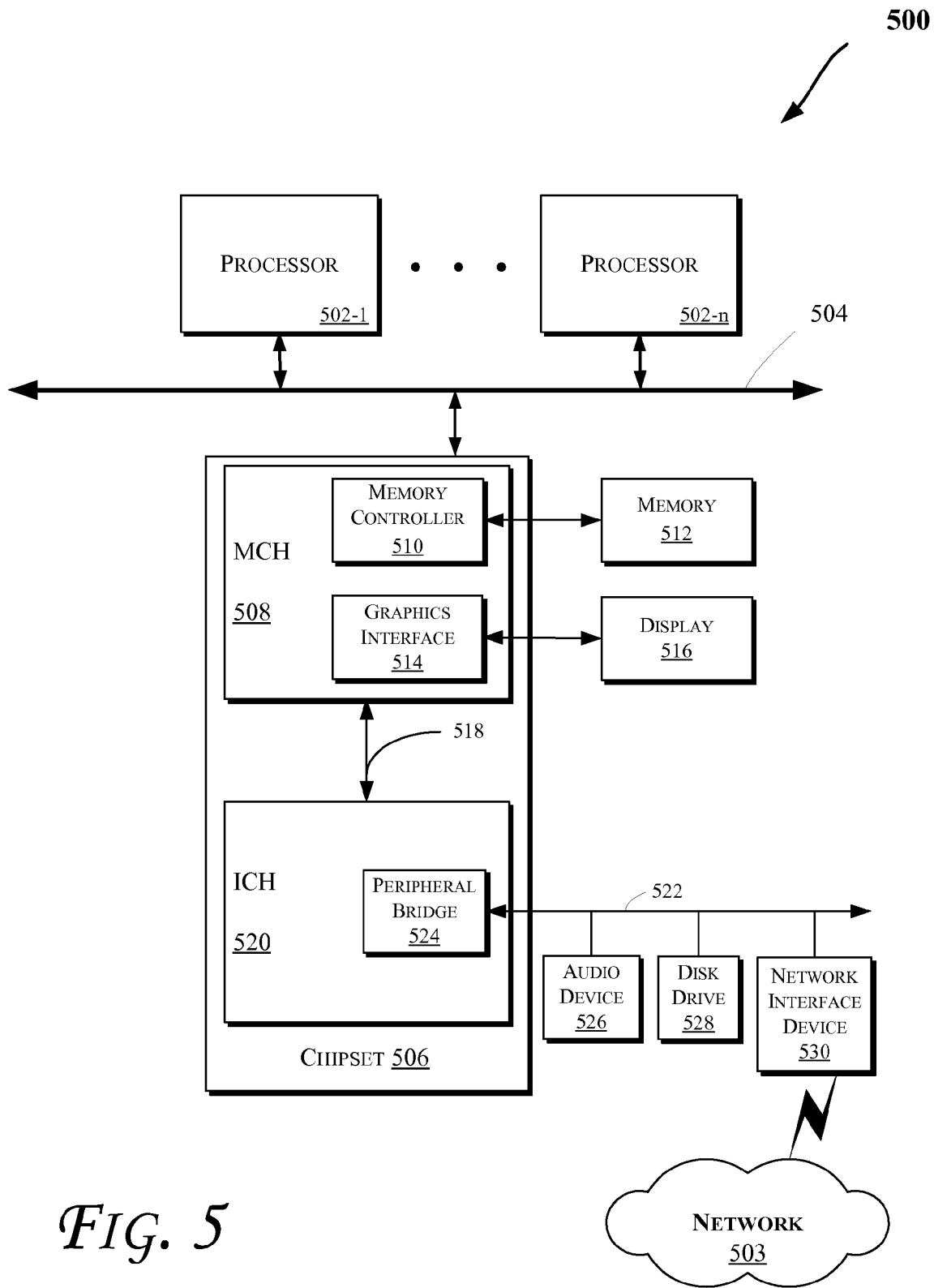
FIGS. 5 and 6 illustrate block diagrams of embodiments of computing systems, which may be utilized to implement some embodiments discussed herein.

FIG. 5 illustrates a block diagram of an embodiment of a computing system 500. In various embodiments, one or more of the components of the system 500 may be provided in various electronic devices capable of performing one or more of the operations discussed herein with reference to some embodiments of the invention. For example, one or more of the components of the system 500 may be used to perform the operations discussed with reference to FIGS. 1-4. Also, various storage devices discussed herein (e.g., with reference to FIGS. 5 and/or 6) may be used to store data (including instructions), operation results, capsule related data, etc. In one embodiment, data associated with operations of method 400 of FIG. 4 may be stored in memory device(s) (such as memory 512 or one or more caches (e.g., L1, mid-level, or last level caches in an embodiment) present in processors 502 of FIG. 5 or 602/504 of FIG. 6).

Moreover, the computing system 500 may include one or more central processing unit(s) (CPUs) 502 or processors that communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. Additionally, the processors 502 may utilize an SIMD (Single Instruction, Multiple Data) architecture. Moreover, the operations discussed with reference to FIGS. 1-4 may be performed by one or more components of the system 500.

A chipset 506 may also communicate with the interconnection network 504. The chipset 506 may include a memory control hub (MCH) 508. The MCH 508 may include a memory controller 510 that communicates with a memory 512. The memory 512 may store data, including sequences of instructions that are executed by the CPU 502, or any other device included in the computing system 500. In one embodiment of the invention, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The MCH 508 may also include a graphics interface 514 that communicates with a display 516. The display 516 may be used to show a user results of operations associated with the Brownian Bridge algorithm discussed herein. In one embodiment of the invention, the graphics interface 514 may communicate with the display 516 via an accelerated graphics port (AGP). In an embodiment of the invention, the display 516 may be a flat panel display that communicates with the graphics interface 514 through, for example, a signal converter that translates a digital representation of an image stored in a storage device such as video memory or system memory into display signals that are interpreted and displayed by the display 516. The display signals produced by the interface 514 may pass through various control devices before being interpreted by and subsequently displayed on the display 516.

A hub interface 518 may allow the MCH 508 and an input/output control hub (ICH) 520 to communicate. The ICH 520 may provide an interface to I/O devices that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530, which may be in communication with the computer network 503. In an embodiment, the device 530 may be a NIC capable of wireless communication. Other devices may communicate via the bus 522. Also, various components (such as the network interface device 530) may communicate with the MCH 508 in some embodiments of the invention. In addition, the processor 502 and the MCH 508 may be combined to form a single chip. Furthermore, the graphics interface 514 may be included within the MCH 508 in other embodiments of the invention.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 500 may be arranged in a point-to-point (PtP) configuration such as discussed with reference to FIG. 6. For example, processors, memory, and/or input/output devices may be interconnected by a number of point-to-point interfaces.

Figure 6:
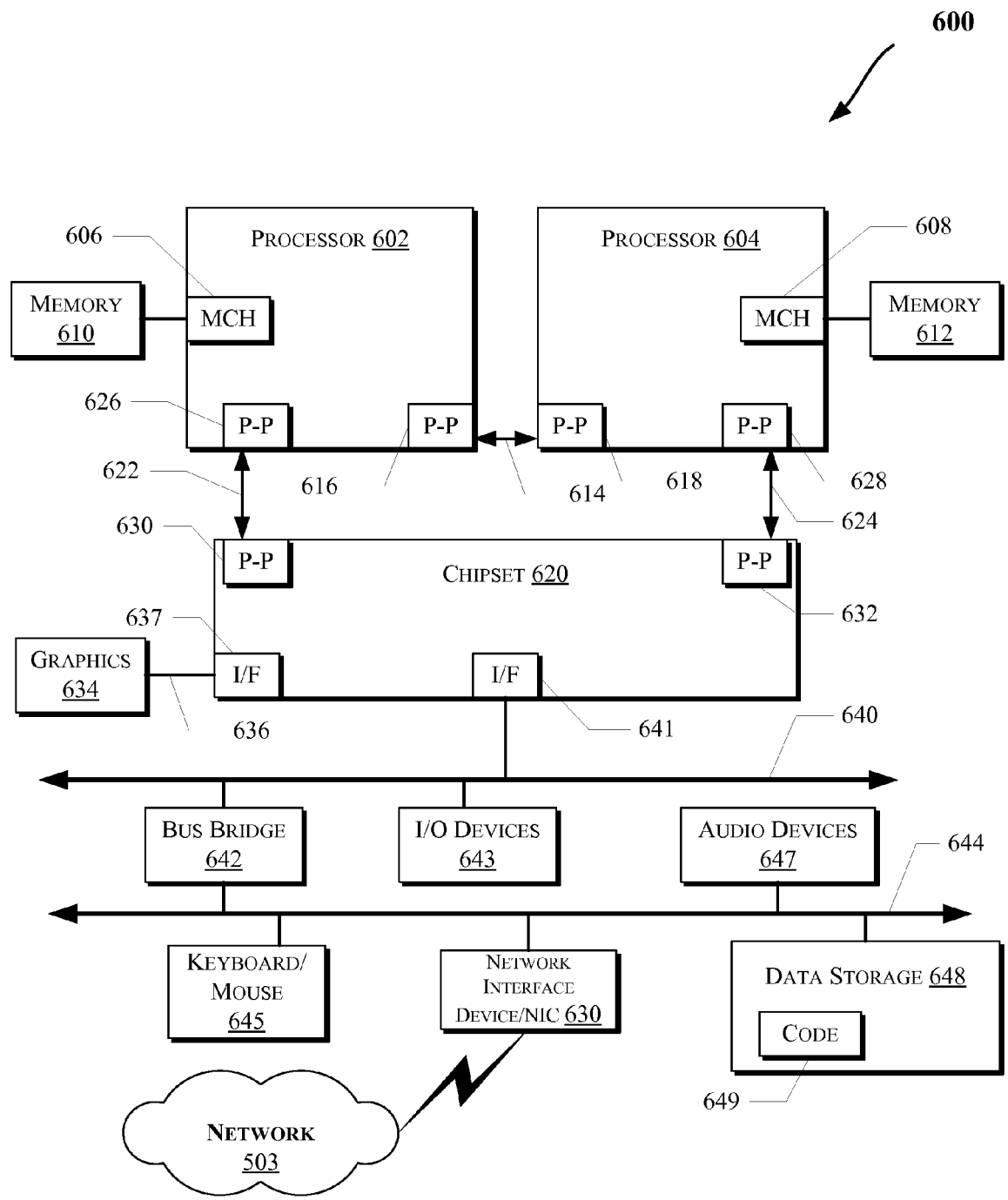

More specifically, FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to couple with memories 610 and 612. The memories 610 and/or 612 may store various data such as those discussed with reference to the memory 512 of FIG. 5.

The processors 602 and 604 may be any suitable processor such as those discussed with reference to the processors 502 of FIG. 5. The processors 602 and 604 may exchange data via a point-to-point (PtP) interface 614 using PtP interface circuits 616 and 618, respectively. The processors 602 and 604 may each exchange data with a chipset 620 via individual PtP interfaces 622 and 624 using point to point interface circuits 626, 628, 630, and 632. The chipset 620 may also exchange data with a high-performance graphics circuit 634 via a high-performance graphics interface 636, using a PtP interface circuit 637.

At least one embodiment of the invention may be provided by utilizing the processors 602 and 604. For example, the processors 602 and/or 604 may perform one or more of the operations of FIGS. 1-5. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may be coupled to a bus 640 using a PtP interface circuit 641. The bus 640 may have one or more devices coupled to it, such as a bus bridge 642 and I/O devices 643. Via a bus 644, the bus bridge 643 may be coupled to other devices such as a keyboard/mouse 645, the network interface device 630 discussed with reference to FIG. 6 (such as modems, network interface cards (NICs), or the like that may be coupled to the computer network 503), audio I/O device, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., logic circuitry), software (including, for example, micro-code that controls the operations of a processor such as the processors discussed with reference to FIGS. 5-6), firmware, or combinations thereof, which may be provided as a computer program product, e.g., including a tangible machine-readable or computer-readable medium having stored thereon instructions (or software procedures) used to program a computer (e.g., a processor or other logic of a computing device) to perform an operation discussed herein. The machine-readable medium may include a storage device such as those discussed with respect to FIGS. 1-6.

Additionally, such tangible computer-readable media may be downloaded as a computer program product, wherein the program may be transferred from a remote computer (e.g., a server) to a requesting computer (e.g., a client) by way of data signals in propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a non-volatile memory to store content corresponding to a capsule; and
a processor to:
detect a capsule update request;
store the content corresponding to the capsule in the memory;
construct a capsule descriptor, wherein a capsule variable is to be defined for the capsule descriptor to comprise: a list of one or more physical locations of the content corresponding to the capsule stored on the non-volatile memory and a NV (Non-Volatile) attribute, wherein the NV attribute is to indicate whether the capsule variable is to survive a platform reset; and
generate a signal to cause a volatile memory destructive reset in response to storage of the capsule descriptor.

2. The apparatus of claim 1, further comprising a firmware, wherein the firmware is to be updated in accordance with the content corresponding to the capsule.

3. The apparatus of claim 1, wherein the processor is to access the one or more physical locations on the non-volatile memory to read the content corresponding to the capsule in response to a platform initialization caused by the volatile memory destructive reset.

4. The apparatus of claim 1, wherein the capsule descriptor is file system agnostic.

5. The apparatus of claim 1, further comprising a capsule update request flag, wherein the processor is to detect the capsule update request based on a value stored in the capsule update request flag.

6. The apparatus of claim 5, wherein the processor is to store a value in the capsule update request flag in response to a request by an operating system.

7. The apparatus of claim 6, further comprising a volatile memory to store the operating system.

8. The apparatus of claim 1, further comprising a computer system that comprises the processor and the non-volatile memory, wherein the computer system is incapable of supporting a memory non-destructive reset.

9. The apparatus of claim 1, wherein the processor comprises a plurality of processor cores.

10. The apparatus of claim 1, wherein the capsule variable is to be defined for the capsule descriptor to comprise: the list of one or more physical locations of the content corresponding to the capsule stored on the non-volatile memory and one or more attributes comprising: the NV (Non-Volatile) attribute, a BS (Boot Service) attribute, and an RT (Run-Time) attribute, wherein the BS and RT attributes are to indicate when the capsule variable is accessible.

11. A method comprising:
receiving a request to generate a capsule;
storing content corresponding to the capsule in a non-volatile memory;
constructing a capsule descriptor having a capsule variable to be defined for the capsule descriptor to comprise: a list of one or more physical locations of the content corresponding to the capsule stored on the non-volatile memory and a NV (Non-Volatile) attribute, wherein the NV attribute is to indicate whether the capsule variable is to survive a platform reset; and
performing a volatile memory destructive reset in response to storage of the capsule descriptor.

12. The method of claim 11, further comprising updating a firmware in accordance with the content corresponding to the capsule.

13. The method of claim 11, further comprising accessing the one or more physical locations on the non-volatile memory to read the content corresponding to the capsule in response to a platform initialization caused by the volatile memory destructive reset.

14. The method of claim 11, wherein receiving the request comprises determining a value stored in a capsule update request flag.

15. The method of claim 14, further comprising updating a value stored in the update request flag based on a request by an operating system.

16. The method of claim 11, further comprising loading the content corresponding to the capsule from the non-volatile memory in response to a request to process the capsule.

17. The method of claim 16, further comprising performing one or more operations corresponding to the loaded capsule content.

18. The method of claim 11, wherein the capsule variable is to be defined for the capsule descriptor to comprise: the list of one or more physical locations of the content corresponding to the capsule stored on the non-volatile memory and one or more attributes comprising: the NV (Non-Volatile) attribute, a BS (Boot Service) attribute, and an RT (Run-Time) attribute, wherein the BS and RT attributes are to indicate when the capsule variable is accessible.

19. A non-transitory computer-readable medium comprising one or more instructions that when executed on a processor configure the processor to perform one or more operations to:
receive a request to generate a capsule;
store content corresponding to the capsule in a non-volatile memory;
construct a capsule descriptor, wherein a capsule variable is to be defined for the capsule descriptor to comprise: a list of one or more physical locations of the content corresponding to the capsule stored on the non-volatile memory and a NV (Non-Volatile) attribute, wherein the NV attribute is to indicate whether the capsule variable is to survive a platform reset; and
perform a volatile memory destructive reset in response to storage of the capsule descriptor.

20. The non-transitory computer-readable medium of claim 19, further comprising one or more instructions that when executed on a processor configure the processor to update a firmware in accordance with the content corresponding to the capsule.

21. The non-transitory computer-readable medium of claim 19, further comprising one or more instructions that when executed on a processor configure the processor to access the one or more physical locations on the non-volatile memory to read the content corresponding to the capsule in response to a platform initialization caused by the volatile memory destructive reset.

22. The non-transitory computer-readable medium of claim 19, further comprising one or more instructions that when executed on a processor configure the processor to determine a value stored in a capsule update request flag.

23. The non-transitory computer-readable medium of claim 19, further comprising one or more instructions that when executed on a processor configure the processor to define the capsule variable for the capsule descriptor to comprise: the list of one or more physical locations of the content corresponding to the capsule stored on the non-volatile memory and one or more attributes comprising: the NV (Non-Volatile) attribute, a BS (Boot Service) attribute, and an RT (Run-Time) attribute, wherein the BS and RT attributes are to indicate when the capsule variable is accessible.

* * * * *